Aug. 27, 1929.                J. O. KER                1,725,926
                          POULTRY LEG BAND
                          Filed Dec. 8, 1928
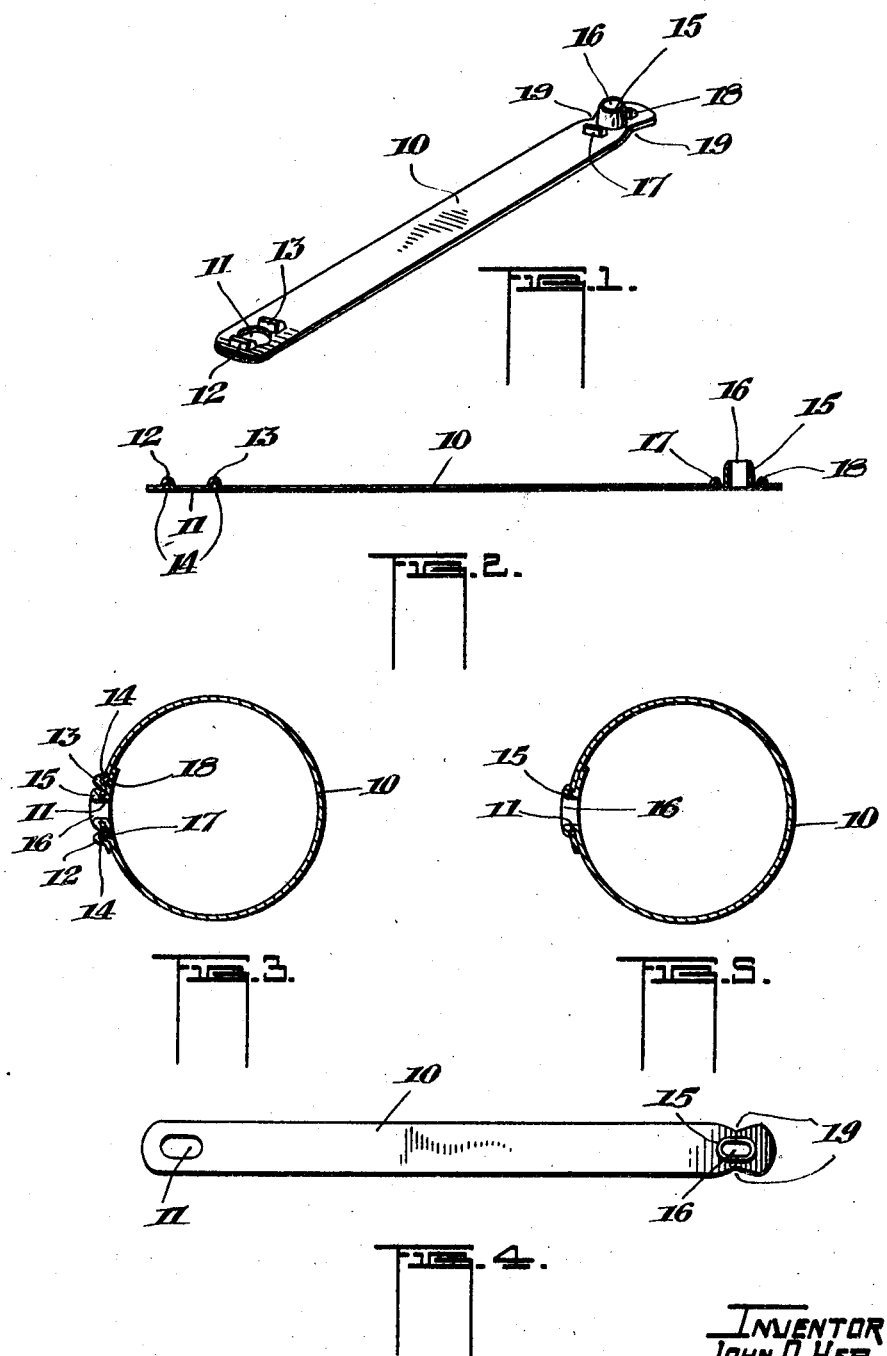

Patented Aug. 27, 1929.

1,725,926

UNITED STATES PATENT OFFICE.

JOHN ORMOND KER, OF OTTAWA, ONTARIO, CANADA, ASSIGNOR TO HARRY G. KETCHUM, OF LUZERNE, NEW YORK.

POULTRY LEG BAND.

Application filed December 8, 1928. Serial No. 324,765.

This invention relates to improvements in leg bands and more particularly to leg bands for poultry and animals adapted to be attached to them for markers.

The invention may also be used for other purposes such as for car seals.

The primary objects of the invention are to provide a simple, cheap and durable marking band which can be readily attached and which will not, when in place, interfere in any way with the animal or fowl and which will not accumulate dirt, and finally which can not be removed without detection.

The example as illustrated in the accompanying drawings is applied to a poultry leg band.

I am aware that metallic bands have been used before for this purpose but I am also aware from years of practical experience that the joining of such bands has been found to permit longitudinal and sometimes lateral movement permitting the bands to become loose and thus unsatisfactory and liable to accumulate dirt. They are also in this condition likely to be removed without detection. With my improved band this is impossible and the whole elements are so constructed that when engaged or sealed they render movement in any direction impossible.

In attaining the foregoing objects I provide a flexible metallic strip formed with a hole adjacent one end and an open topped stud punched adjacent the other end forming interengaging members and having associated therewith co-operating bulges or bosses protruding on one side of the strip so that when the strip is folded and the stud is brought into engagement with the hole in the bent opposite end the bulges or bosses co-operating with such stud will register with the recesses co-operating with the hole in the strip and on the strip being clamped the bosses and the stud engage and lock with the recesses and the hole thereby effectively eliminating all chances of lateral movement and securely double locking the band in position.

Referring now to the drawings in which like characters of reference indicate corresponding parts in each figure, Figure 1 is a perspective view of the band in flat form.

Figure 2 is a longitudinal section.

Figure 3 is a sectional view of the band with its ends attached.

Figure 4 is a plan view of a modified form of band in flat form.

Figure 5 is a sectional view of the form shown in Fig. 4.

As illustrated, the band 10 may be made of a strip of suitable metal such as aluminum or any other ductile non-corrodible substance and is provided at one end with a hole or eye 11 which may be round or, as shown in the modified form in Figure 4, oval. This eye is provided on each side with punched-out lugs or bosses 12 and 13 which form, on the underside, corresponding recesses as at 14 (see Figure 3). The other end of the strip 10 is formed with a co-operating stud 15 preferably slightly cone shaped and open at the top as at 16. This stud is punched out of the blank and is also provided on each side with punched-out bosses or lugs 17 and 18 forming on the other side recesses hereinafter more fully referred to. The sides of the strip registering with this stud are also oppositely recessed or notched as at 19.

The two ends of the band are attached by bringing the hold 11 over the stud 15 and inserting the latter therein. This operation causes the bosses 17 and 18 at the same time to engage with the recesses 14 in the underside of the strip and registering with the lugs 12 and 13. In this manner the stud 15 locks with the opening 11 and the strip is further doubly locked by the engagement of the bosses 17 and 18 with the recesses 14 of the lugs 12 and 13, the latter preventing any possibility of lateral or longitudinal movement and making a double locked, and thereby doubly efficient, joint.

In the modified form as shown in Figures 4 and 5 the bosses adjacent each end may be dispensed with while the hole 11 is formed oval and the stud 15 is of similar construction.

As many changes could be made in the above construction and many apparently widely different embodiments of my invention, within the scope of the claims, constructed without departing from the spirit or scope thereof, it is intended that all matter contained in the accompanying specification and drawings shall be interpreted as illustrative and not in a limiting sense.

What I claim as my invention is:—

1. A poultry band having an open topped hollow stud punched therein adjacent one end and a hole adjacent the other end for engagement with said stud, bosses protruding on one face of the band and forming recesses on the other face of the band for co-operation with the stud and the hole in the band, whereby on the ends of the band being brought together and overlapped, the stud engages with the hole and the bosses simultaneously engage with the recesses.

2. A poultry band comprising a flexible metallic strip provided at opposite ends with an opening and an open topped integral stud respectively, bosses associated with the stud and the hole on one side of the strip and recesses formed by said bosses in the other side of the strip whereby on the ends of the strip being overlapped the stud may engage with the opening in the strip and the bosses on one side of the strip and associated with the stud simultaneously may engage with the recesses associated with the opening and on the other side of the strip.

3. In a device of the character described the combination with a flexible metallic band, formed with an opening in one end and a stud punched in the other end, of bosses on one side of the strip co-operating with the stud and the hole, and recesses corresponding to said bosses on the other side of the strip and adapted on the ends of the strip being overlapped, to be engaged by the bosses on the other side of the strip, to double lock the strip in folded position.

4. The invention according to claim 3 in which the stud is substantially cone-shaped, and formed with an open top.

5. The invention according to claim 3 in which the sides of the strip are formed with oppositely disposed notches adjacent one end.

In witness whereof I have hereunto set my hand.

JOHN ORMOND KER.